United States Patent [19]
Pitner

[11] 3,765,736
[45] Oct. 16, 1973

[54] COMBINED RADIAL AND THRUST BEARING

[75] Inventor: Alfred Pitner, Paris, France
[73] Assignee: Nadella, Rueil-Malmaison, France; a part interest
[22] Filed: Jan. 13, 1972
[21] Appl. No.: 217,466

[30] Foreign Application Priority Data
Feb. 11, 1971 France .............................. 7104637

[52] U.S. Cl. ............................................... 308/174
[51] Int. Cl. ........................................... F16c 19/34
[58] Field of Search.................... 308/212, 213, 214, 308/174

[56] References Cited
UNITED STATES PATENTS
2,063,787  12/1936  Brown................................ 308/174
3,128,134  4/1964   Dorl.................................. 308/174

FOREIGN PATENTS OR APPLICATIONS
1,252,228  12/1960  France.............................. 64/17 A Primary Examiner—Charles J. Myhre
Assistant Examiner—F. S. Frank Susko
Attorney—Robert E. Burns et al.

[57] ABSTRACT

Combined radial and thrust rolling bearing having inseparable component parts for a shaft defining an inner raceway for the radial bearing and a raceway for the thrust bearing. The combined bearing comprises; a radial cage for the needles of the radial bearing and a thrust bearing cage for the rolling members of the thrust bearing. A case defines a cylindrical outer raceway for the radial bearing needles and a radial support for the thrust bearing and defines at the end opposed to the radial support a flange for retaining the radial bearing cage. The outside diameter of the thrust bearing cage exceeds the diameter of a geometric cylinder inscribed within and tangent to the needles and this cage retains the thrust bearing rolling members in respect of movement away from the radial support. The needles are retained by the radial bearing cage in respect of movement radially inwardly of the bearing. The cages have adjacent rim portions capable of coming into sliding contact with each other and relatively rotating. Means are provided which define a raceway adjacent the radial support for the thrust bearing rolling members. The radial bearing cage is axially retained by direct contact with either the radial support or with a portion of the thrust bearing cage which is in direct contact with the radial support.

17 Claims, 6 Drawing Figures

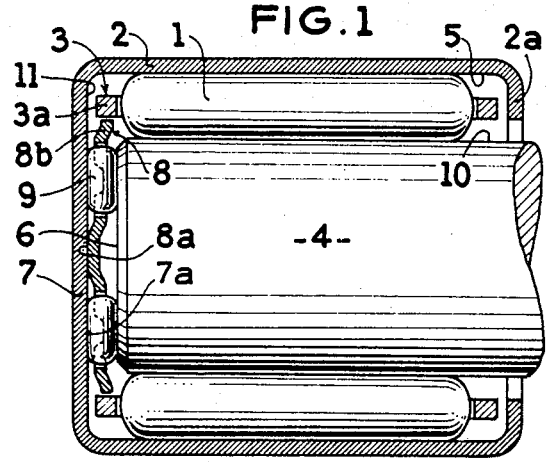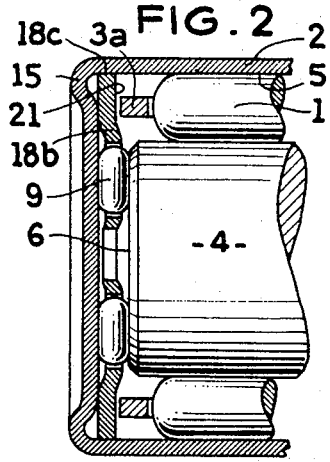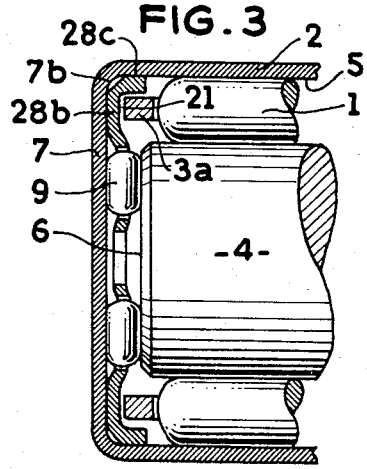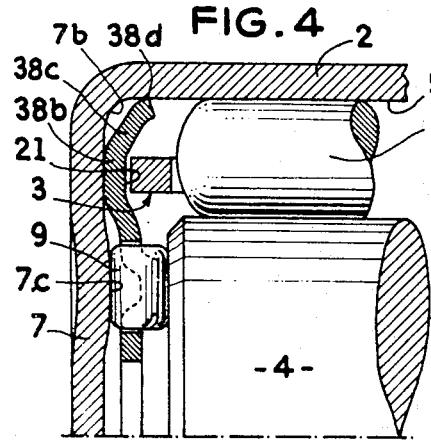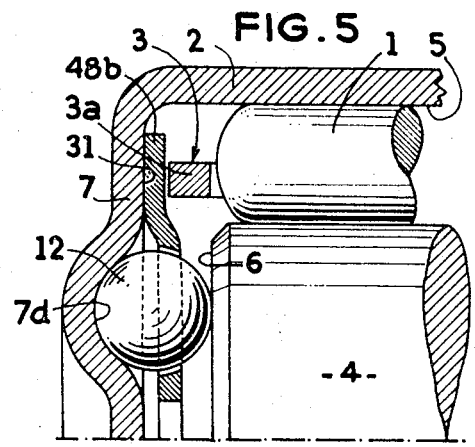

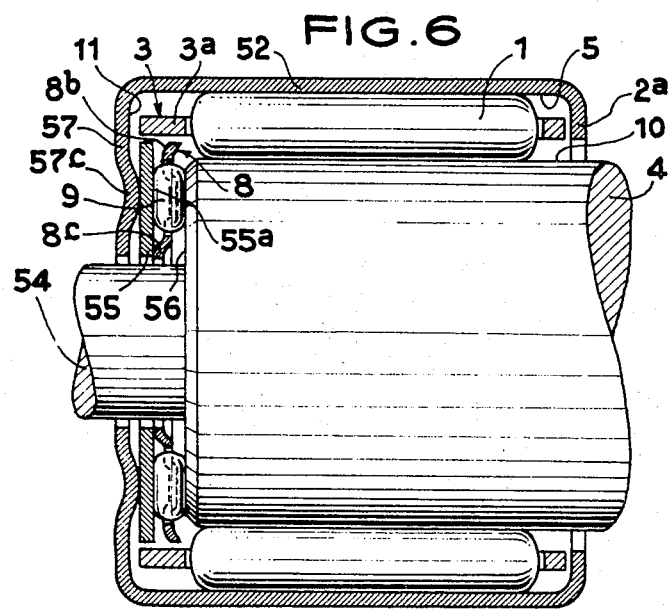

COMBINED RADIAL AND THRUST BEARING

The present invention relates to a combined radial and thrust rolling bearing in which the rolling members are guided in a cage in each bearing part and located within a case defining a cylindrical raceway for the needles of the radial bearing and a radial support face for the thrust bearing and in which the thrust bearing cage has an outside diameter greater than the diameter of a cylinder inscribed in and tangent to the needles and axially retains the rolling members of the thrust bearing in respect of movement away from the radial support face, the needles of the radial bearing being retained in respect of inward movement by the radial bearing cage.

In a known rolling bearing of this type, whose case is in the form of a cup, the cage containing the thrust bearing rolling members is retained by the radial bearing needles. However, owing to the fact that the cage possibly provided for containing the radial bearing needles is retained at the end of the cup opposed to the end wall of the cup by an independent sealing ring, this known combined rolling bearing does not constitute an assembly in which all the component parts are inseparable.

Another drawback of the known arrangement is that the cage containing the thrust bearing rolling members is centered by the latter so that the thrust exerted in a direction towards the end wall of the cup by the radial bearing needles is applied on the thrust bearing cage which is in overhanging relation and is liable to become distorted.

An object of the invention is to remedy the aforementioned drawbacks.

The invention provides a combined radial and thrust rolling bearing wherein adjacent rim portions of the two cages are free to come into sliding contact with each other, the cage containing the thrust bearing rolling members being free to come into sliding contact with the thrust bearing raceway adjacent the radial support face of the case, the case being of thin sheet metal and having at the end of the case opposed to the radial support face a radial flange which axially retains the radial bearing cage.

Owing to the fact that, first, the thrust bearing cage is retained between the radial support face of the sheet metal case and the radial bearing and, second, the radial bearing cage is axially retained by the case, the combined bearing just defined affords an indivisible assembly whose component parts cannot be taken apart and this greatly facilitates handling and manipulation of the bearing prior to mounting.

The feature that the cage of the thrust bearing can bear against the corresponding raceway is in conformity with the teaching of French Pat. No. 1,262,005 and it ensures that the means provided on the cage for axially retaining the thrust bearing rolling members do not come into contact with said rolling members. Further, owing to this feature, the radial bearing needles can exert their thrust in the direction of the end of the case opposed to the retaining flange and on the radial support face of the case through, first, the rim portion of the radial bearing cage and, second, the adjacent peripheral portion of the thrust bearing cage which is in contact with the radial support face of the case. Alternatively, the radial support face of the case can also receive the direct contact of the rim portion of the radial bearing cage.

The thrust bearing rolling members are preferably needles but could be balls, in which latter case one of the raceways for the balls is constituted by a groove formed in the radial support face of the case.

The case may be a cup whose end wall defines a support face for a shaft end through the thrust bearing. Alternatively, the case may be constructed in the form of a ring having open end portions whose openings have different diameters so as to permit the radial supporting face to take the thrust exerted through the thrust bearing by the shoulder of a shaft extending through the combined rolling bearing.

Further features and advantages of the invention will be apparent from the ensuing description with reference to the accompanying drawings.

In the drawings :

FIG. 1 is an axial sectional view of a combined radial and axial rolling bearing according to the invention having a cup in which the thrust bearing cage is centered within the radial bearing cage;

FIG. 2 is a partial axial sectional view of another embodiment of a combined rolling bearing in which the thrust bearing cage is centered within the cylindrical wall portion of the cup by the peripheral edge portion of the cage;

FIG. 3 is a partial axial sectional view of another embodiment of a combined rolling bearing in which the thrust bearing cage is centered within the cylindrical wall portion of the cup by a cylindrical flange on the periphery of the thrust bearing cage;

FIG. 4 is a partial axial sectional view of an embodiment of a combined rolling bearing in which the thrust bearing cage is centered within the cylindrical wall portion of the cup, the end wall portion of the cup having a convex raceway for thrust bearing needles;

FIG. 5 is a partial axial sectional view of another embodiment of a combined rolling bearing in which the thrust bearing rolling members are balls, and FIG. 6 is an axial sectional view of an embodiment of a combined rolling bearing comprising a ring in which the thrust bearing rolling members are needles which roll along a plate applied against a radial support face of the ring.

In the embodiment shown in FIG. 1, needles 1 contained with a cup 2 of thin sheet metal are located in apertures of a cylindrical cage 3 and arranged around a shaft 4 whose end face 6 constitutes one of the raceways for thrust bearing needles 9 contained in a cage 8, the other raceway for the needles 9 being constituted by the inner face 7a of an end wall portion 6 of the cup 7. The thrust bearing cage 8, whose centre portion 8a bears against the end wall portion 7 of the cup,has means for axially retaining the needles 9 in respect of movement away from the end wall portion 7 and its peripheral edge portion 8b constituted by the edge portion of the sheet metal washer from which the cage is formed, is centered with play by the adjacent rim portion 3a of the radial bearing cage 3. Consequently, the thrust bearing needle cage 8 is retained axially, prior to mounting the shaft 4, by the ends of the needles 1, the cage 3 being axially retained by a flange 2a formed at the end of the cup opposed to the end wall portion 7. The rim portion 3a of the cage 3 is capable of bearing at 11 against the flat end wall portion 7 of the cup 2.

It will be observed that the peripheral portion 8b of the thrust bearing cage 8 is bent towards the ends of the needles 1 so as to limit the axial movement of the thrust bearing cage prior to mounting the shaft 4 so that there is no risk of the needles 9, which are not axially retained by the cage 3 in respect of movement toward the end wall portion 7, assuming an oblique position which would render the mountingimpossible.

Further, in accordance with the teaching of French Pat. No. 1,262,005, the axial needle retaining means provided on the thrust bearing cage 8 are so arranged that they remain out of contact with the needles when the shaft 4 bears thereagainst, irrespective of the position of the cage 8 between the shaft end 6 and the cup end wall portion 7.

In FIG. 2, the thrust bearing cage 8 has a plane peripheral edge portion 18b which is capable of coming into contact with the cup end wall portion 7, the edge 18c of the portion 18b being centered within the cylindrical raceway 5 formed on the cup 2. The edge portion 18b thus defines a plane bearing face 21 for the rim portion 3a of the radial bearing cage 3, so that the thrust of the needles 1 is transmitted to the end wall portion 7 through the two cages. Any interference between the edge of the edge portion 18c of the thrust bearing cage 8 and the connection zone between the end wall portion 7 and the cylindrical raceway of the cup 2 is avoided owing to clearance afforded by an inner peripheral groove 15 formed in the cup end wall portion 7.

In FIG. 3, the cup end wall portion 7 has a plane shape as in the embodiment shown in FIG. 1 and, in order to ensure that the peripheral portion 28b of the thrust bearing cage 8 which bears flat against the cup end wall portion 7 does not touch the fillet 7b between the end wall portion 7 and the cylindrical portion 5 of the cup 2, the portion 28b is connected to a cylindrical flange portion 28c by a radiused portion whose radius exceeds the radius of the fillet 7b. The flange portion 28c centers the cage 8 in contact with the cylindrical portion 5 of the cup 2.

In FIG. 4, the plane edge portion 38b of the thrust bearing cage is extended by an oblique portion 38c which somewhat constitutes a chord with respect to the radiused fillet 7b, the end of this portion 38c being radiused or bent in a suitable manner at 38d so as to have a centering contact with the cylindrical inner face 5 of the cup 2. Further, a raceway 7c for the thrust bearing needles 9, defined by the cup end wall portion 7, has a convex shape so as to avoid excessive stress on the ends of the needles 9 in the known manner.

In FIG. 5, the rolling members of the thrust bearing are balls 12 having a raceway 7d which is formed in the cup end wall portion 7 and has a corresponding concave cross-sectional shape. The outer edge portion 48b of the cage 8 extends at right angles to the radial bearing cage 3 and defines a plane face applied against the cup end wall portion 7 and acts as a support 31 for the rim portion 3a of the radial bearing cage. The portion 48b is not centered with respect to the raceway 5 of the cup 2, as in the embodiments shown in FIGS. 2 to 4, since the thrust bearing cage 8 is centered by the balls 12.

Whereas in FIGS. 1 to 5 the combined rolling bearing comprises a cup 2 whose end wall portion 7 takes the axial thrust exerted by the end of the shaft 4, FIG. 6 shows an embodiment in which the combined rolling bearing comprises a ring 52 of thin sheet metal having one end provided with a radial flange 2a identical to the radial flange of the foregoing embodiments and another end extended by a radial support wall portion 57 which takes the axial thrust exerted by a shoulder 56 of a shaft 4 which has its larger diameter portion engaged in the radial bearing part and its smaller diameter portion 54 disposed in the opening defined by the support wall portion 57.

The thrust exerted by the shoulder 56 is transmitted to the support wall portion 57 through a thrust rolling bearing having needles 9 bearing on a face constituting a raceway 55a of an annular plate 55. The opposite face of the plate 55 bears against a convex portion 57c of the radial support wall portion 57, this plate 55 having an outside diameter less than the diameter of the radial bearing cage 3. The inner peripheral edge portion 8c of the thrust bearing cage 8 is capable of sliding on the face 55a of the plate 55 and the outer peripheral edge portion 8b of this cage is, as in the embodiment shown in FIG. 1, curved or bent towards the needles 1 of the radial bearing cage 3. The latter has a rim portion 3a capable of coming into contact with the plane inner face 11 of the radial support wall portion 57 of the ring 52.

Having now described my invention what I claim and desire to secure by Letters Patent is:

1. A combined radial rolling bearing and thrust rolling bearing having inseparable component parts for receiving means defining an inner raceway for the radial bearing and a raceway for the thrust bearing, said combined bearing comprising in combination radial bearing rolling members and a radial bearing cage which constitutes a unit with the rolling members, thrust bearing rolling members and a thrust bearing cage, a case which is composed of thin sheet metal and surrounds the rolling members and defines a cylindrical outer raceway for the rolling members of the radial bearing which are needles and defines a radial support for the thrust bearing, the thrust bearing cage having an outside diameter exceeding the diameter of a geometric cylinder inscribed within and tangent to the needles so as to be axially retained by said unit and combined with the thrust bearing rolling members in a manner to retain the thrust bearing rolling members in respect of movement away from the radial support, the needles being combined with the radial bearing cage in a manner to be retained by the radial bearing cage in respect of movement radially inwardly of the bearing, the cages having rim portions which are free to come into sliding contact with each other and free to relatively rotate ,means defining a raceway adjacent the radial support for the thrust bearing rolling members, the case defining adjacent an end of the case opposed to the radial support a radial flange which is capable of axially retaining the radial bearing cage ,the radial bearing cage being capable of being axially retained by said case at an end of said case opposed to said radial flange through contact with one of two elements constituted by said radial support and a portion of said thrust bearing cage, said portion of said thrust bearing cage being free to axially contact said radial support.

2. A combined bearing as claimed in claim 1, wherein the radial support has a marginal portion and the radial bearing cage is capable of directly contacting the marginal portion, the radial bearing cage rim portion having an inner cylindrical face which is adjacent the radial support and is capable of centering an outer peripheral portion of the thrust bearing cage with play.

3. A combined bearing as claimed in claim 2, wherein the outer peripheral portion of the thrust bearing cage extends axially toward the radial bearing needles.

4. A combined bearing as claimed in claim 1, wherein the thrust bearing cage has a plane annular portion which is in contact with the radial support and defines a bearing face for the adjacent rim portion of the radial bearing cage.

5. A combined bearing as claimed in claim 4, wherein the case has a cylindrical wall portion and the thrust bearing cage is centered within said cylindrical wall portion.

6. A combined bearing as claimed in claim 5, wherein the thrust bearing cage has an outer peripheral portion which is centered in the cylindrical wall portion and the radial support has an outer peripheral groove defining a clearance between the case and the peripheral edge portion of the thrust bearing cage.

7. A combined bearing as claimed in claim 5, wherein a cylindrical flange extends the plane annular portion of the thrust bearing cage, the cylindrical flange having a centering contact with the cylindrical wall portion of the case.

8. A combined bearing as claimed in claim 1, wherein the thrust bearing rolling members are needles.

9. A combined bearing as claimed in claim 8, wherein the radial support defines said raceway for the thrust bearing needles, which raceway is convex.

10. A combined bearing as claimed in claim 8, comprising a convex annular portion on the radial support face, and a plane plate having one face bearing against the convex annular portion of the radial support and an opposite face constituting said raceway for the thrust bearing needles.

11. A combined bearing as claimed in claim 8, wherein the thrust bearing cage has retaining means for the thrust bearing needles which are incapable of contacting the thrust bearing needles when the thrust bearing needles are urged against the radial support by another raceway on a shaft when the shaft is inserted in the combined bearing for rotation in the combined bearing.

12. A combined bearing as claimed in claim 1, wherein the case is a cup having a closed end wall portion constituting said radial support.

13. A combined bearing as claimed in claim 12, wherein the thrust bearing cage has a centre portion bearing against the end wall portion of the cup.

14. A combined bearing as claimed in claim 1, wherein the case is a ring having a radial support for taking the thrust exerted through the thrust bearing by a shaft mounted in the bearing.

15. A combined bearing as claimed in claim 4, wherein the thrust bearing rolling members are balls and the radial support of the case has an annular groove having a curvilinear cross-sectional shape which defines said raceway for the balls.

16. A combined radial rolling bearing and thrust rolling bearing having inseparable component parts for receiving means defining an inner raceway for the radial bearing and a raceway for the thrust bearing, said combined bearing comprising in combination radial bearing rolling members and a radial bearing cage which constitutes a unit with the rolling members, thrust bearing rolling members and a thrust bearing cage, a case which is composed of thin sheet metal and surrounds the rolling members and defines a cylindrical outer raceway for the rolling members of the radial bearing which are needles and defines a radial support for the thrust bearing, the thrust bearing cage having an outside diameter exceeding the diameter of a geometric cylinder inscribed within and tangent to the needles so as to be axially retained by said unit and combined with the thrust bearing rolling members in a manner to retain the thrust bearing rolling members in respect of movement away from the radial support, the needles being combined with the radial bearing cage in a manner to be retained by the radial bearing cage in respect of movement radially inwardly of the bearing, the cages having rim portions which are free to come into sliding contact with each other and free to relatively rotate, means defining a raceway adjacent the radial support for the thrust bearing rolling members, the thrust bearing cage having a portion which is free to come into sliding contact with one of two elements constituted by said radial support and said thrust bearing raceway, the case defining adjacent an end of the case opposed to the radial support a radial flange which is capable of axially retaining the radial bearing cage, and the radial bearing cage being capable of being axially retained by direct contact with said radial support.

17. A combined radial rolling bearing and thrust rolling bearing having inseparable component parts for receiving means defining an inner raceway for the radial bearing and a raceway for the thrust bearing, said combined bearing comprising in combination radial bearing rolling members and a radial bearing cage which constitutes a unit with the rolling members, thrust bearing rolling members and a thrust bearing cage, a case which is composed of thin sheet metal and surrounds the rolling members and defines a cylindrical outer raceway for the rolling members of the radial bearing which are needles and defines a radial support for the thrust bearing, the thrust bearing cage having an outside diameter exceeding the diameter of a geometric cylinder inscribed within and tangent to the needles so as to be axially retained by said unit and combined with the thrust bearing rolling members in a manner to retain the thrust bearing rolling members in respect of movement away from the radial support, the needles being combined with the radial bearing cage in a manner to be retained by the radial bearing cage in respect of movement radially inwardly of the bearing, the cages having rim portions which are free to come into sliding contact with each other and free to relatively rotate, the radial support having a portion defining a raceway for the thrust bearing rolling members, the case defining adjacent an end of the case opposed to the radial support a radial flange which is capable of axially retaining the radial bearing cage, the radial bearing cage being capable of being axially retained by a portion of the thrust bearing cage, which portion of the thrust bearing cage is capable of bearing axially against the radial support.

* * * * *